(12) United States Patent
Minami

(10) Patent No.: US 12,180,041 B2
(45) Date of Patent: Dec. 31, 2024

(54) CRANE DEVICE

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 623 days.

(21) Appl. No.: 17/285,615

(22) PCT Filed: Oct. 16, 2019

(86) PCT No.: PCT/JP2019/040747
§ 371 (c)(1),
(2) Date: Apr. 15, 2021

(87) PCT Pub. No.: WO2020/080434
PCT Pub. Date: Apr. 23, 2020

(65) Prior Publication Data
US 2021/0316966 A1 Oct. 14, 2021

(30) Foreign Application Priority Data

Oct. 16, 2018 (JP) .................. 2018-195430

(51) Int. Cl.
| | | |
|---|---|---|
| *B66C 13/46* | (2006.01) | |
| *H04N 5/262* | (2006.01) | |
| *H04N 5/265* | (2006.01) | |
| *H04N 23/57* | (2023.01) | |
| *H04N 23/667* | (2023.01) | |
| *H04N 23/80* | (2023.01) | |

(52) U.S. Cl.
CPC .......... *B66C 13/46* (2013.01); *H04N 5/2628* (2013.01); *H04N 5/265* (2013.01); *H04N 23/57* (2023.01);
(Continued)

(58) Field of Classification Search
CPC .......... B66C 1/40; B66C 13/40; B66C 13/46; B66C 13/48; B66C 2700/0342;
(Continued)

(56) References Cited

U.S. PATENT DOCUMENTS

| | | | |
|---|---|---|---|
| 8,358,371 B1 * | 1/2013 | Dickey | B66C 13/46 348/372 |
| 9,571,795 B2 * | 2/2017 | Fujikawa | H04N 23/635 |

(Continued)

FOREIGN PATENT DOCUMENTS

JP    2011-079648 A    4/2011

OTHER PUBLICATIONS

Jan. 7, 2020, International Search Report issued for related PCT application No. PCT/JP2019/040747.

(Continued)

*Primary Examiner* — Adam D Tissot
*Assistant Examiner* — Aaron K McCullers
(74) *Attorney, Agent, or Firm* — Paratus Law Group, PLLC

(57) ABSTRACT

The crane device includes: a camera provided on a hook; a camera control unit which controls an image-capturing operation of the camera on the basis of control information for operating a carrying element; and an image processing unit which processes a captured image that has been captured with the camera. The camera captures an image of the carrying destination of a baggage. The image processing unit takes, as a reference area, an arbitrary area in the image captured with the camera, generates a correction image obtained by projecting the captured image onto a plane that is parallel to the reference area and is perpendicular to an arbitrary direction with the baggage used as a viewpoint, calculates a current position of the baggage in the correction image, and displays the current position in a visually recognizable mode.

4 Claims, 10 Drawing Sheets

(52) U.S. Cl.
CPC ........... *H04N 23/667* (2023.01); *H04N 23/80* (2023.01); *B66C 2700/0342* (2013.01)

(58) Field of Classification Search
CPC ...... H04N 5/2628; H04N 5/265; H04N 23/57; H04N 23/58; H04N 23/667; H04N 23/80; B60R 1/00; B60R 1/002; B60R 1/20; B60R 1/22; B60R 1/23; B60R 1/24; E02F 9/261; G01B 11/00; G01C 11/04; G01C 11/06; G06T 7/00; G06T 7/30; G06T 7/33; G06T 7/40; G06T 7/50; G06T 7/536; G06T 7/60; G06T 7/70; G06T 3/00; G06T 3/0006; G06T 3/0037; G06T 3/0043; G06T 3/0093; G06T 3/20; G06T 3/40; G06T 5/00; G06T 5/006; G06V 20/00; G06V 10/00; G06V 10/20; G06V 10/24; G06V 10/242
USPC ......... 212/280, 281; 340/685; 382/254, 255, 382/285, 286, 289, 293, 295, 296; 414/699, 700, 701, 749.3; 701/50, 523
See application file for complete search history.

(56) References Cited

U.S. PATENT DOCUMENTS

| | | | | |
|---|---|---|---|---|
| 2006/0093239 | A1* | 5/2006 | Kakinami | G06T 3/0018 382/275 |
| 2012/0320211 | A1* | 12/2012 | Mitsugi | G06T 3/00 348/148 |
| 2014/0107971 | A1* | 4/2014 | Engedal | B66D 1/52 702/150 |
| 2015/0249821 | A1* | 9/2015 | Tanizumi | G06T 7/593 348/46 |
| 2016/0070978 | A1* | 3/2016 | Song | H04N 5/2628 348/222.1 |
| 2016/0119589 | A1* | 4/2016 | Tanizumi | H04N 23/635 345/173 |
| 2018/0143011 | A1* | 5/2018 | Rudy | B66C 23/76 |

OTHER PUBLICATIONS

Jan. 7, 2020, International Search Opinion issued for related PCT application No. PCT/JP2019/040747.

* cited by examiner

CRANE DEVICE

CROSS REFERENCE TO PRIOR APPLICATION

This application is a National Stage Patent Application of PCT International Patent Application No. PCT/JP2019/040747 (filed on Oct. 16, 2019) under 35 U.S.C. § 371, which claims priority to Japanese Patent Application No. 2018-195430 (filed on Oct. 16, 2018), which are all hereby incorporated by reference in their entirety.

TECHNICAL FIELD

The present invention relates to a crane device.

BACKGROUND ART

Conventionally, when baggage is installed between a plurality of pillars or already installed structures with a mobile crane or the like, highly accurate installation work is required. Such highly accurate installation work is performed by collaborative work by an operator of the crane and a plurality of workers who perform monitoring and guidance at an installation location. The operator of the crane performs the installation work according to an image of a monitoring camera provided at a tip of a boom and an instruction from the worker. In such installation work, there is known a fixed image display system that confirms the positional relationship between a suspended baggage and a peripheral structure and a state of an installation location by an imaging means or a sensor. An example thereof is disclosed in Patent Literature 1.

In a fixed image display system described in Patent Literature 1, an imaging means for capturing an image and a range sensor for measuring the distance from baggage to an obstacle and position information are installed below the baggage, and an image processing unit displays the distance from the baggage to the obstacle and position information on a display means. With this configuration, the distance between the baggage and the obstacle and a state of an installation location are clarified, and highly accurate installation work can be performed.

However, the fixed image display system described in Patent Literature 1 has a configuration in which the imaging means and the range sensor are attached directly to the baggage. Thus, there is a case where it is difficult to attach the imaging means and the range sensor to appropriate locations depending on a shape of the baggage and an installation condition. In addition, the fixed image display system is complicated since it is necessary to attach and detach the imaging means and the range sensor each time the baggage is carried.

CITATION LIST

Patent Literature

Patent Literature 1: JP 2011-79648 A

SUMMARY OF THE INVENTION

Problems to be Solved by the Invention

An object of the present invention is to provide a crane device which is capable of performing highly accurate installation work without being influenced by a shape of baggage and an installation condition of the baggage.

Solutions to Problems

A crane device according to the present invention is, which actuates a carrying element including a boom and a hook suspended from the boom and carries baggage to a carrying destination, includes: a camera provided on the hook; a camera control unit which controls an image-capturing operation of the camera based on control information for operating the carrying element; and an image processing unit which processes a captured image that has been captured with the camera. The camera captures an image of the carrying destination of the baggage. The image processing unit takes, as a reference area, an arbitrary area in the captured image that has been captured with the camera, generates a correction image obtained by projecting the captured image onto a plane that is parallel to the reference area and is perpendicular to an arbitrary direction with the baggage used as a viewpoint, calculates a current position of the baggage in the correction image, and displays the current position in a visually recognizable mode.

Effects of the Invention

According to the present invention, a position of the baggage with respect to a feature or an obstacle is calculated based on the correction image taking the position of the baggage generated by the conversion of the image as the viewpoint, and is displayed in the visually recognizable mode without providing a camera in the baggage. As a result, the highly accurate installation work can be performed without being influenced by the shape of the baggage and the installation condition of the baggage.

DESCRIPTION OF EMBODIMENTS

Hereinafter, a mobile crane 1 (hereinafter, referred to as "crane 1") including a crane device 6 according to an embodiment of the present invention will be described with reference to FIGS. 1 and 2. Note that, although a rough terrain crane will be described as the crane 1 in the present embodiment, the crane 1 may be an all-terrain crane, a truck crane, a loading truck crane, or the like.

Figure 1:
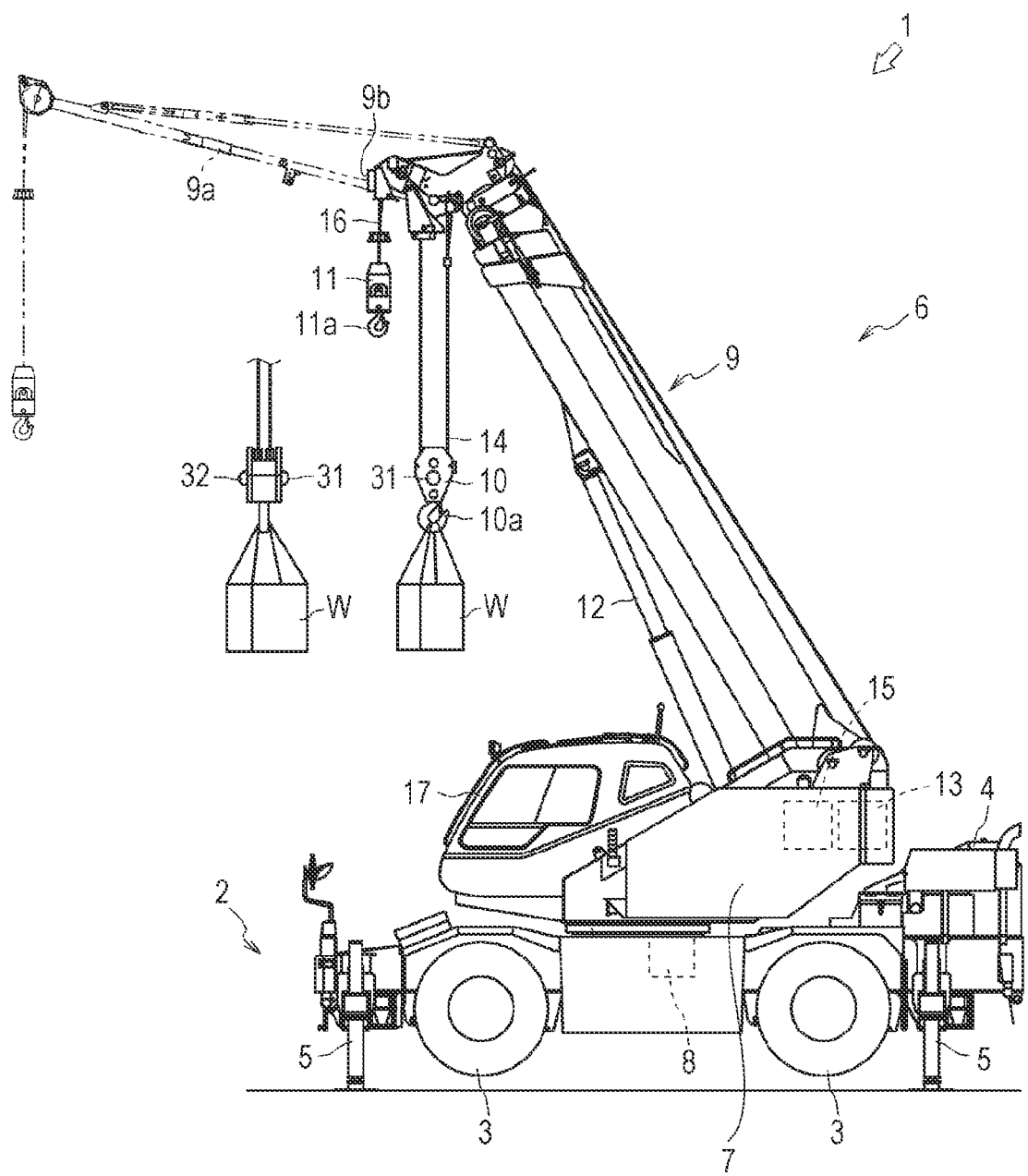
FIG. 1 is a side view illustrating an overall configuration of a crane.
Figure 2:
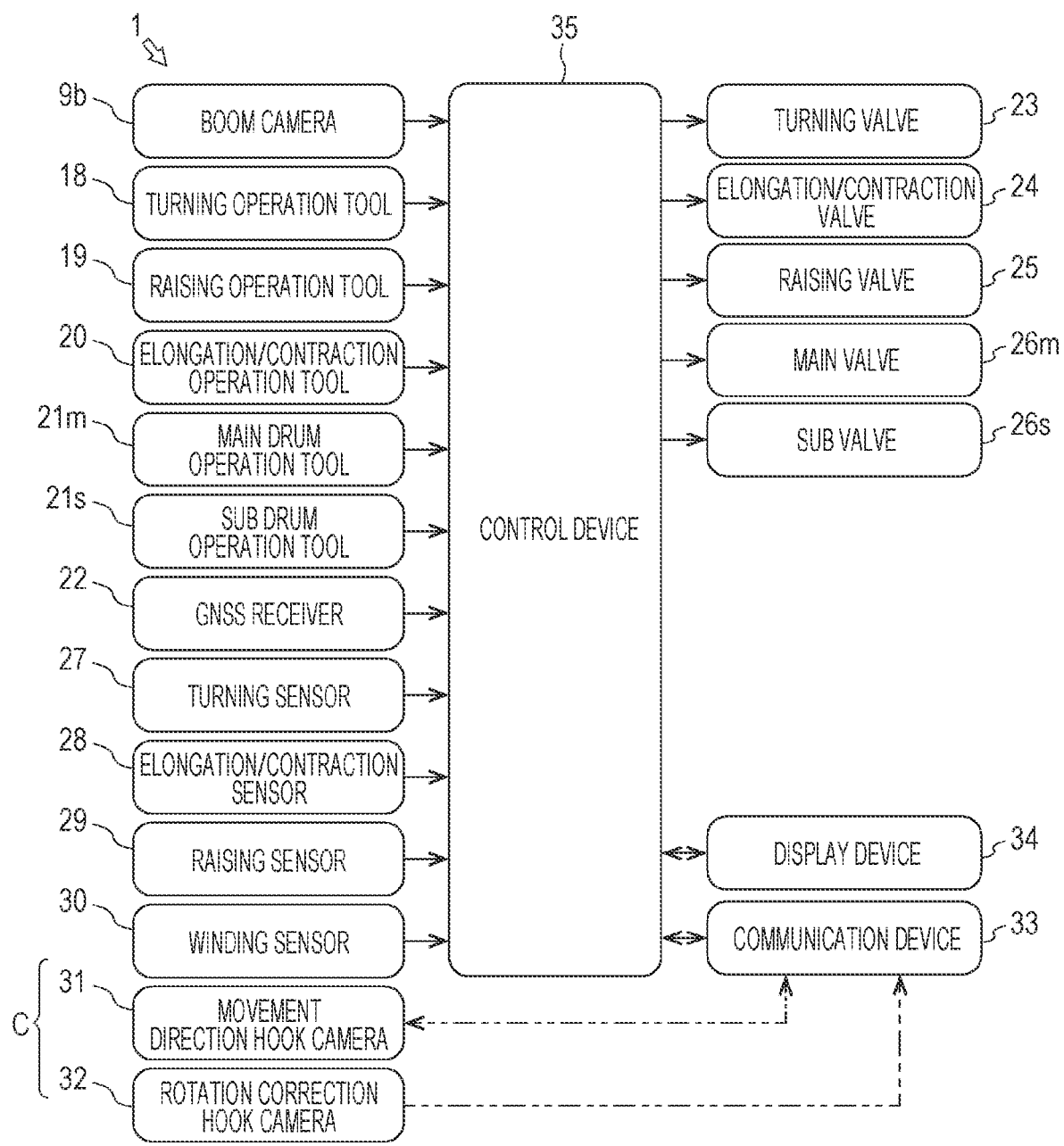
FIG. 2 is a block diagram illustrating a control configuration of the crane.

As illustrated in FIG. 1, the crane 1 is the mobile crane that can move to an unspecified place. The crane 1 includes a vehicle 2 and a crane device 6.

The vehicle 2 is a traveling body that carries the crane device 6. The vehicle 2 has a plurality of wheels 3 and travels with an engine 4 as a power source. The vehicle 2 is provided with an outrigger 5. The outrigger 5 is constituted by a projecting beam that can be hydraulically extended on both sides in a width direction of the vehicle 2 and a hydraulic jack cylinder that can be extended in a direction perpendicular to the ground.

The crane device 6 is a working machine that lifts and carries baggage W with a wire rope. The crane device 6 includes a turning base 7, a boom 9, a jib 9a, a main hook block 10, a sub hook block 11, a raising hydraulic cylinder 12, a main winch 13, a main wire rope 14, a sub winch 15, a sub wire rope 16, a cabin 17, a GNSS receiver 22, a hook camera C, a communication device 33, a display device 34, a control device 35, and the like. In the crane device 6, the turning base 7, the boom 9, the jib 9a, the main hook block 10, the sub hook block 11, the raising hydraulic cylinder 12, the main winch 13, the main wire rope 14, the sub winch 15, and the sub wire rope 16 are carrying elements configured to carry the baggage W to a target position.

The turning base 7 is a rotation device that allows the crane device 6 to turn. The turning base 7 is provided on a frame of the vehicle 2 via an annular bearing. The turning base 7 is configured to be rotatable about a center of the annular bearing as a center of rotation. The turning base 7 is provided with a hydraulic turning hydraulic motor 8 which is an actuator. The turning base 7 is configured to be rotatable in one direction and the other direction by the turning hydraulic motor 8.

The turning hydraulic motor 8 is driven by the supply of hydraulic oil from the turning valve 23. The turning valve 23 is configured using, for example, an electromagnetic proportional switching valve. The turning valve 23 can control a flow rate of the hydraulic oil supplied to the turning hydraulic motor 8 to an arbitrary flow rate. That is, the turning base 7 is configured to be controllable to an arbitrary turning speed via the turning hydraulic motor 8. The turning base 7 is provided with a turning sensor 27.

The boom 9 is a movable prop that supports the wire rope to a state of being capable of lifting the baggage W. The boom 9 is configured using a plurality of boom members arranged in a nested manner, and is elongatable and contractible in the axial direction. A proximal end of the boom 9 (base boom member) is attached to be swingable (raisable) at approximately a center of the turning base 7. The boom member is configured to be connectable to an elongation/contraction hydraulic cylinder (not illustrated). In addition, the jib 9a is provided on the boom 9.

The elongation/contraction hydraulic cylinder (not illustrated) is an actuator that elongates and contracts the boom 9. The elongation/contraction hydraulic cylinder is driven by supplying hydraulic oil from the elongation/contraction valve 24 (see FIG. 2). The elongation/contraction valve 24 is configured using, for example, an electromagnetic proportional switching valve. The elongation/contraction valve 24 can control a flow rate of hydraulic oil supplied to the elongation/contraction hydraulic cylinder to an arbitrary flow rate. The boom 9 elongates and contracts as each boom member moves in the axial direction along with the elongation and contraction of the elongation/contraction hydraulic cylinder (not illustrated). The boom 9 is provided with an elongation/contraction sensor 28 that detects a length of the boom 9.

A boom camera 9b captures images of the baggage W and a feature around the baggage W. The boom camera 9b is provided at a tip of the boom 9, for example, and is configured to be capable of capturing the images of the baggage W and the feature and terrain around the crane 1 from vertically above the baggage W.

The main hook block 10 and the sub hook block 11 suspend the baggage W. The main hook block 10 includes a plurality of hook sheaves (not illustrated) around which the main wire rope 14 is wound, and a main hook 10a for suspending the baggage W. The sub hook block 11 has a sub hook 11a suspending the baggage W.

The raising hydraulic cylinder 12 is an actuator that raises and lowers the boom 9 and holds the attitude of the boom 9. In the raising hydraulic cylinder 12, an end portion of a cylinder section is swingably connected to the turning base 7, and an end portion of a rod section is swingably connected to the base boom member of the boom 9. The raising hydraulic cylinder 12 is driven by supplying hydraulic oil from a raising valve 25. The raising valve 25 is configured using, for example, an electromagnetic proportional valve. The raising valve 25 can control a flow rate of hydraulic oil supplied to the raising hydraulic cylinder 12 to an arbitrary flow rate. The boom 9 is raised or lowered as the raising hydraulic cylinder 12 elongates or contracts.

The boom 9 is provided with a raising sensor 29 that detects an attitude (raising angle) of the boom 9.

Each of the main winch 13 and the sub winch 15 is configured to wind up (reel up) and feed out (release) the main wire rope 14 and the sub wire rope 16.

The main winch 13 has a main drum around which the main wire rope 14 is wound and a main hydraulic motor rotating the main drum (neither of which are illustrated). The main hydraulic motor is driven by the supply of hydraulic oil from the main valve 26m. The main valve 26m is configured using, for example, an electromagnetic proportional switching valve. In the main winch 13, the main hydraulic motor is controlled by the main valve 26m, and the main drum rotates to wind up and feed out the main wire rope 14 at an arbitrary speed.

Similarly, the sub winch 15 has a sub drum around which the sub wire rope 16 is wound and a sub hydraulic motor rotating the sub drum (neither of which is illustrated). The sub hydraulic motor is driven by the supply of hydraulic oil from the sub valve 26s. The sub valve 26s is configured using, for example, an electromagnetic proportional valve. In the sub winch 15, the sub hydraulic motor is controlled by the sub valve 26s, and the sub drum rotates to wind up and feed out the sub wire rope 16 at an arbitrary speed.

Each of the main winch 13 and the sub winch 15 is provided with a winding sensor 30 that detects each fed-out amount L of the main wire rope 14 and the sub wire rope 16.

The cabin 17 is an operator's seat configured to operate the crane 1 and is mounted on the turning base 7. The cabin 17 is provided with travel operation tools configured for operating the vehicle 2 to travel and crane operation tools configured to operate the crane device 6. The crane operation tools include a turning operation tool 18 configured to turn the turning base 7, a raising operation tool 19 configured to raise the boom 9, an elongation/contraction operation tool 20 configured to elongate and contract the boom 9, a main drum operation tool 21m configure to wind up and feed out the main wire rope 14, a sub drum operation tool 21s configured to wind up and feed out the sub wire rope 16, and the like. The turning hydraulic motor 8, the raising hydraulic cylinder 12, the elongation/contraction hydraulic cylinder (not illustrated), the main hydraulic motor (not illustrated), and the sub hydraulic motor (not illustrated) are controlled based on input signals from the turning operation tool 18, the raising operation tool 19, the elongation/contraction operation tool 20, the main drum operation tool 21*m*, and the sub drum operation tool 21*s*, respectively.

The GNSS receiver 22 is a receiver forming a global navigation satellite system, receives a range radio wave from the satellite, and calculates the latitude, longitude, and altitude which are position coordinates of the receiver. The GNSS receiver 22 is provided, for example, at the tip of the boom 9 and the cabin 17 (hereinafter, the GNSS receivers 22 provided at the tip of the boom 9 and the cabin 17 are collectively referred to as the "GNSS receiver 22"). That is, the crane 1 can acquire the position coordinate of the tip of the boom 9 and the position coordinate of the cabin 17 by the GNSS receiver 22.

The hook camera C is a device that captures an image for measuring the position and attitude (orientation) of the baggage W. The hook camera C is detachably provided on the hook block to be used between the main hook block 10 and the sub hook block 11 by, for example, a magnet or the like. In the present embodiment, the hook camera C is provided on the main hook block 10. The hook camera C is configured such that a capturing direction can be changed by a control signal of the crane device 6.

The hook camera C includes: a movement direction hook camera 31 that captures an image of a subject, such as a feature, an obstacle, or a ground surface (including a surface onto which the baggage W is lowered such as a floor surface of a structure) existing at a carrying destination of the baggage, that is, in a movement direction of the baggage W based on the control signal of the crane device 6; and a rotation correction hook camera 32 which captures an image of the boom 9 from vertically below.

In the present embodiment, the movement direction hook camera 31 and the rotation correction hook camera 32 are configured using separate cameras. As a result, the captured image of the subject existing in the movement direction of the baggage W and the captured image of the boom 9 can be acquired at the same time. Note that the movement direction hook camera 31 and the rotation correction hook camera 32 may be used in combination using one camera.

In addition, the movement direction hook camera 31 is configured using a plurality of cameras having different capturing areas (some of the capturing areas may overlap each other). In this case, a camera capable of capturing an image of a feature or the like existing in the movement direction of the baggage W is appropriately selected from the plurality of movement direction hook cameras 31 and used for capturing. As a result, even if the main hook block 10 swings around the vertical axis, the image of the subject existing in the movement direction of the baggage W can be reliably captured.

The movement direction hook camera 31 transmits a captured image i2 on which the subject existing in the movement direction of the baggage W has appeared to the control device 35 by wireless communication or the like. The rotation correction hook camera 32 transmits a captured image i3 on which the boom 9 has appeared to the control device 35 by wireless communication or the like.

The communication device 33 is an interface that transmits and receives various types of data to and from the movement direction hook camera 31, the rotation correction hook camera 32, and an external server. The communication device 33 is provided in the cabin 17, for example.

The display device 34 is an input/output device that displays the captured image i2 captured by the movement direction hook camera 31, a correction image ia obtained by performing image processing on the captured image i2, and the like, and receives an input operation for designating a reference area that serves as a reference for the image processing. The display device 34 is provided in the cabin 17. The display device 34 is provided with an operation tool such as a touch panel and a mouse as an input device capable of inputting the reference area that serves as the reference for the image processing.

The control device 35 controls the actuators of the crane device 6 (the turning hydraulic motor 8, the elongation/contraction hydraulic cylinder, the raising hydraulic cylinder 12, the main hydraulic motor, and the sub hydraulic motor) via the respective operation valves (the turning valve 23, the elongation/contraction valve 24, the raising valve 25, the main valve 26*m*, and the sub valve 26*s*). In addition, the control device 35 performs image processing such as coordinate conversion on data of the captured images acquired from the movement direction hook camera 31 and the rotation correction hook camera 32. The control device 35 is provided, for example, in the cabin 17. In practice, the control device 35 may be configured such that a CPU, a ROM, a RAM, an HDD, and the like are connected via a bus, or may be configured using a one-chip LSI or the like. The control device 35 stores various programs and data in order to control operations of the respective actuators, switching valves, sensors, hook cameras, and the like and to process image data.

The control device 35 is connected to the boom camera 9*b*, and acquires the captured image i1 from the boom camera 9*b*. In addition, the control device 35 is connected to the turning operation tool 18, the raising operation tool 19, the elongation/contraction operation tool 20, the main drum operation tool 21*m*, and the sub drum operation tool 21*s*, and acquires operating signals generated by the respective operation tools in response to input operations of an operator. The control device 35 generates a target speed signal Vd of the baggage W based on the operating signals from various operation tools.

The control device 35 acquires data of the captured image i2 from the movement direction hook camera 31 and data of the captured image i3 from the rotation correction hook camera 32 via the communication device 33. In addition, the control device 35 transmits a control signal indicating the movement direction of the baggage W to the movement direction hook camera 31 via the communication device 33.

Here, the control signal is a signal for actuating the carrying element of the crane device 6, and includes at least one of an operating signal, the target speed signal Vd, a target trajectory signal Pd, an operation signal Md, and the like. The operating signal is a signal output from the operation tool in response to with the operator's input operation. The target speed signal Vd is a signal generated based on the operating signal, and includes information on the movement direction and movement speed of the baggage W. The target trajectory signal Pd is a signal generated based on the target speed signal Vd, and indicates a trajectory (position information) of the baggage W at the time of moving the baggage W from a current position to a target position. The operation signal Md is a signal that is generated by the control device 35 in response to the operator's input operation and output to the actuator of the crane device 6. A process of generating the target speed signal Vd, the target trajectory signal Pd, and the operation signal Md will be described later.

In addition, the control device 35 can acquire information on the baggage W and the structure from building information modeling (BIM) operated by the external server or the like via the communication device 33. The information on the baggage W and the structure includes information (three-dimensional data) on a shape, a size, and a position coordinate of each of the baggage W and the structure. In addition, the control device 35 displays the captured image i2, the correction image ia obtained by image conversion, and the like on the display device 34.

The control device 35 generates the operation signal Md corresponding to each operation tool on the basis of operating signals from the turning operation tool 18, the raising operation tool 19, the main drum operation tool 21m, and the sub drum operation tool 21s. In addition, the control device 35 is connected to the turning valve 23, the elongation/contraction valve 24, the raising valve 25, the main valve 26m, and the sub valve 26s, and outputs the operation signal Md generated based on operating signals to the turning valve 23, the raising valve 25, the main valve 26m, and the sub valve 26s. The turning valve 23, the raising valve 25, the main valve 26m, and the sub valve 26s perform predetermined operations based on the operation signal Md.

The control device 35 is connected to the turning sensor 27, the elongation/contraction sensor 28, the raising sensor 29, the raising sensor 29, and the winding sensor 30, and acquires a turning angle θz of the turning base 7, an elongation/contraction length Lb, a raising angle θx, and a fed-out amount Lr of the wire rope.

The crane 1 can move the crane device 6 to an arbitrary position by causing the vehicle 2 to travel. In addition, the crane 1 can expand and contract lift or a working radius of the crane device 6 by raising or lowering the boom 9 at an arbitrary raising angle θx by operating the raising operation tool 19 or by elongating or contracting the boom 9 to the arbitrary elongation/contraction length Lb by operating the elongation/contraction operation tool 20. In addition, the crane 1 can carry the baggage W by lifting the baggage W with the operation of the sub drum operation tool 21s and the like and rotating the turning base 7 with the operation of the turning operation tool 18. In addition, the crane 1 can automatically detect the baggage W that needs to be carried from the image captured by the hook camera C and the BIM information.

Figure 3:
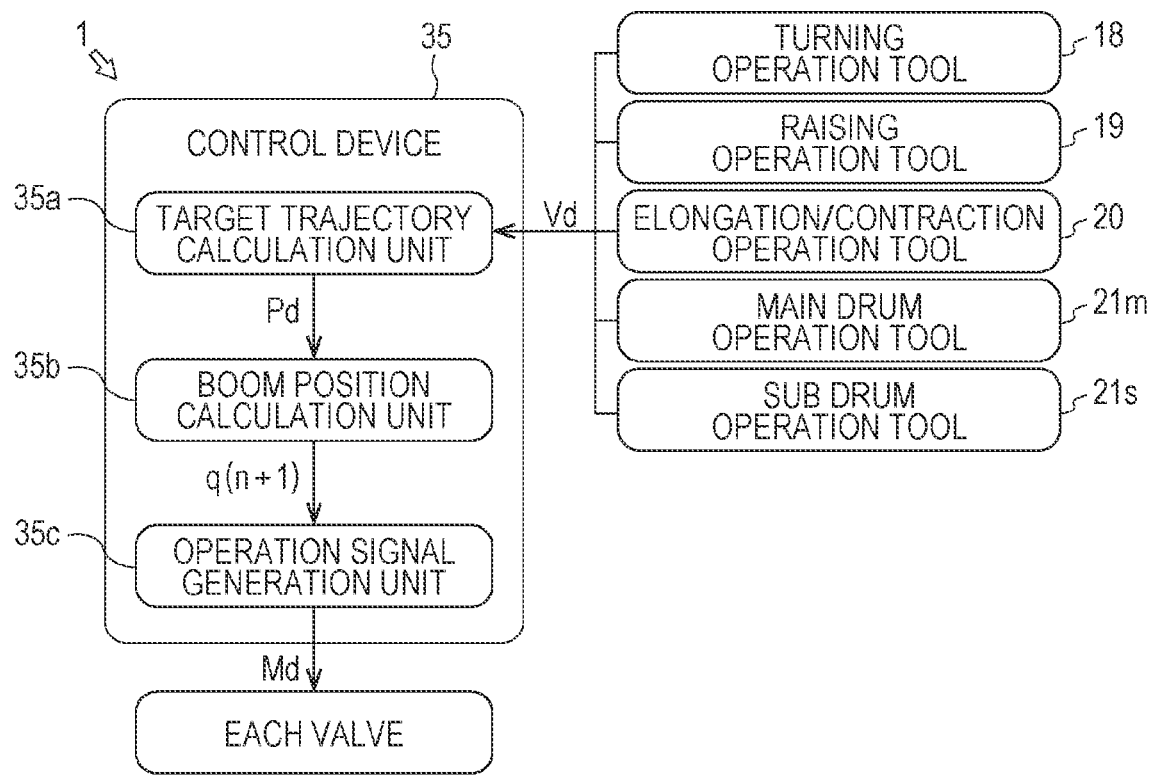
FIG. 3 is a block diagram illustrating a configuration related to inverse dynamics analysis of a crane device.
Figure 4:
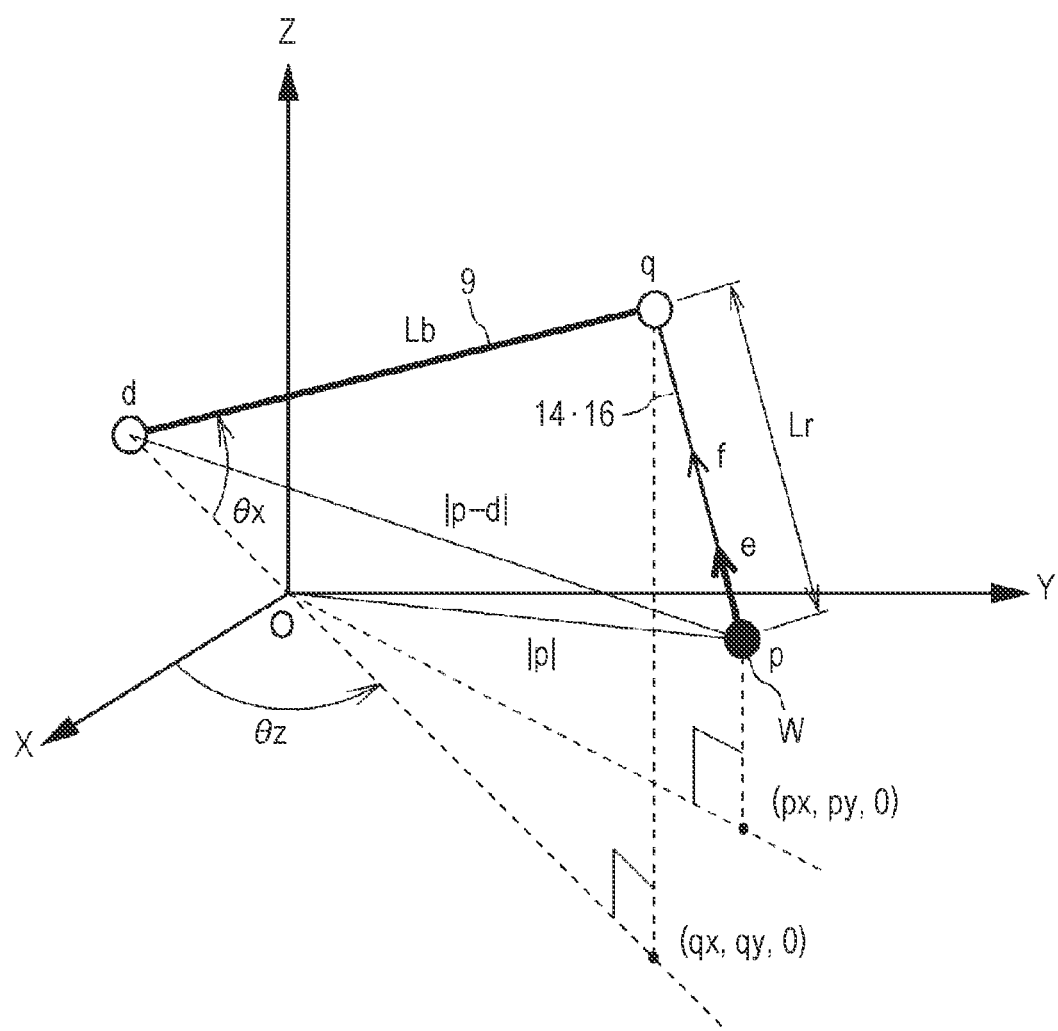
FIG. 4 is a view illustrating an inverse dynamics model of the crane.

Next, a process for generating the operation signal Md in the control device 35 will be described with reference to FIGS. 3 and 4. FIG. 3 is a block diagram illustrating a configuration related to inverse dynamics analysis of the crane device 6. FIG. 4 is a view illustrating an inverse dynamics model of the crane 1.

As illustrated in FIG. 3, the control device 35 functions as a target trajectory calculation unit 35a that calculates the target trajectory signal Pd of the baggage W, a boom position calculation unit 35b that calculates a target position coordinate q(n+1) at the tip of the boom 9, and an operation signal generation unit 35c that generates the operation signal Md.

The target trajectory calculation unit 35a converts the target speed signal Vd of the baggage W into the target trajectory signal Pd of the baggage W. The target trajectory calculation unit 35a acquires the target speed signal Vd of the baggage W generated based on the operating signals from the respective operation tools every unit time t. The target speed signal Vd includes information on the movement direction and movement speed of the baggage W. For example, the target trajectory calculation unit 35a integrates the acquired target speed signal Vd to calculate target position information of the baggage W, and applies a low-pass filter to the target position information of the baggage W to calculate the target trajectory signal Pd every unit time t.

The boom position calculation unit 35b calculates the target position coordinate q(n+1) at the tip of the boom 9 based on attitude information of the boom 9, current position information of the baggage W, and the target trajectory signal Pd generated by the target trajectory calculation unit 35a. The attitude information of the boom 9 includes a turning angle θz(n) of the turning base 7, an elongation/contraction length Lb(n) of the boom 9, a raising angle θx(n) of the boom 9, and a fed-out amount Lr(n) of the main wire rope 14 or the sub wire rope 16 (hereinafter simply referred to as "wire rope"), and can be acquired from the turning sensor 27, the elongation/contraction sensor 28, the raising sensor 29, and the winding sensor 30, respectively. The current position information of the baggage W can be acquired from the captured image i1 captured by the boom camera 9b.

The boom position calculation unit 35b calculates a current position coordinate p(n) of the baggage W from the acquired current position information of the baggage W. In addition, the boom position calculation unit 35b calculates a current position coordinate q(n) (hereinafter, simply referred to as the "current position coordinate q(n) of the boom 9") indicating a current position of the tip of the boom 9 (a fed-out position of the wire rope) from the acquired turning angle θz(n), elongation/contraction length Lb(n), and raising angle θx(n). In addition, the boom position calculation unit 35b calculates the fed-out amount Lr(n) of the wire rope based on the current position coordinate p(n) of the baggage W and the current position coordinate q(n) of the boom 9.

In addition, the boom position calculation unit 35b calculates a direction vector e(n+1) of the wire rope on which the baggage W is suspended based on the current position coordinate p(n) of the baggage W and a target position coordinate p(n+1) of the baggage W which is a target position of the baggage W after a lapse of the unit time t.

The boom position calculation unit 35b calculates the target position coordinate q(n+1) of the boom 9 after the lapse of the unit time t based on the target position coordinate p(n+1) of the baggage W and the direction vector e(n+1) of the wire rope using inverse dynamics.

The operation signal generation unit 35c acquires the target position coordinate q(n+1) of the boom 9 after the lapse of the unit time t from the boom position calculation unit 35b, and generates the operation signal Md of each actuator based on the target position coordinate q(n+1).

Next, the inverse dynamics model of crane 1 is defined as illustrated in FIG. 4. The inverse dynamics model is defined in the XYZ coordinate system, which is a global coordinate system, and takes an origin O as a turning center of the crane 1. Global coordinates of the origin O shall be obtained from the GNSS receiver 22. In the inverse dynamics model in FIG. 4, "q" indicates, for example, the current position coordinate q(n) of the boom 9, and "p" indicates, for example, the current position coordinate p(n) of the baggage W. "Lb" indicates, for example, the current elongation/contraction length Lb(n) of the boom 9, "θx" indicates, for example, the current raising angle θx(n) of the boom 9, and "θz" indicates, for example, the current turning angle θz(n) of the turning base 7. In addition, "Lr" indicates, for example, the fed-out amount Lr(n) of the wire rope, "f"

indicates current tension f(n) of the wire rope, and "e" indicates, for example, a current direction vector e(n) of the wire rope.

In the inverse dynamics model defined in this manner, the relationship between a target position q at the tip of the boom 9 and a target position p of the baggage W is expressed by Formula (1) using the target position p of the baggage W, a mass m of the baggage W, and a spring constant kf of the wire rope. In addition, the target position q at the tip of the boom 9 is expressed by Formula (2) as a function of time of the baggage W.

[Expression 1]

$$m\ddot{p}=mg+f=mg+k_f(q-p) \quad (1)$$

$$q(t)=p(t)+l(t,\alpha)e(t)=q(p(t),\ddot{p}(t),\alpha) \quad (2)$$

f: Tension of wire rope
$k_f$: Spring constant
m: Mass of baggage W
q: Current position or target position of tip of boom 9
p: Current position or target position of baggage W
Lr: Fed-out amount of wire rope
e: Direction vector
g: Gravitational acceleration The low-pass filter attenuates frequencies above a predetermined frequency, and a transfer function G (s) of the low-pass filter is expressed by, for example, Formula (3). The target trajectory calculation unit 35*a* prevents the occurrence of a singular point (rapid position variation) due to the differential operation by applying a low-pass filter to the target trajectory signal Pd. In the present embodiment, a fourth-order low-pass filter is used to deal with a fourth derivative at the time of calculating the spring constant kf as illustrated in Formula (3), but the low-pass filter of the order suitable for desired characteristics can be applied. a and b in Formula (3) are coefficients.

[Expression 2]

$$G(s) = \frac{a}{(s+b)^4} \quad (3)$$

The fed-out amount L(n) of the wire rope is calculated from the following Formula (4). The fed-out amount Lr(n) of the wire rope is defined by a distance between the current position coordinate q(n) of the boom 9 and the current position coordinate p(n) of the baggage W. That is, the fed-out amount Lr(n) of the wire rope includes a length of a slinging tool.

[Expression 3]

$$l(n)^2=|q(n)-p(n)|^2 \quad (4)$$

The direction vector e(n) of the wire rope is calculated from the following Formula (5). The direction vector e(n) of the wire rope is a vector of a unit length of tension f of the wire rope (see Formula (1)). The tension f of the wire rope is obtained by subtracting gravitational acceleration from acceleration of the baggage W. The acceleration of the baggage W is calculated from the current position coordinate p(n) of the baggage W and the target position coordinate p(n+1) of the baggage W after the lapse of the unit time t.

[Expression 4]

$$e(n) = \frac{f}{|f|} = \frac{\ddot{p}(n)-g}{|\ddot{p}(n)-g|} \quad (5)$$

The target position coordinate q(n+a) of the boom 9 after the lapse of the unit time t is calculated from the following Formula (6) obtained by expressing Formula (1) as a function of n. Here, a indicates the turning angle θz(n) of the boom 9. The target position coordinate q(n+1) of boom 9 is calculated using inverse dynamics from the current fed-out amount Lr(n) of the wire rope, the target position coordinate p(n+1) of the baggage W, and the direction vector e(n+1).

[Expression 5]

$$q(n+1)=p(n+1)+l(n,\alpha)e(t+1)=q(p(n+1),\ddot{p}(n+1),\alpha) \quad (6)$$

Next, processing of the control device 36 for generating the operation signal Md will be described with reference to a flowchart of FIG. 5.

Figure 5:
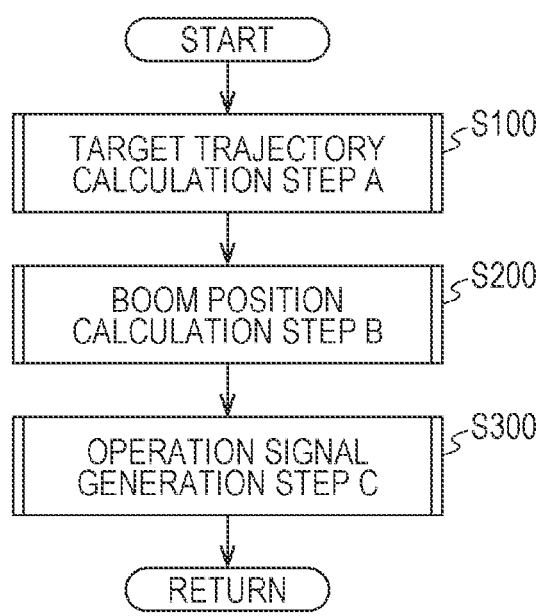
FIG. 5 is a view of a flowchart illustrating a control process of inverse dynamics control of the crane.

As illustrated in FIG. 5, in Step S100, the control device 35 starts a target trajectory calculation step A. The control device 35 applies a low-pass filter to the target speed signal Vd of the generated baggage W, and calculates the target trajectory signal Pd for each unit time t. When the target trajectory calculation step A is completed, the processing proceeds to a process of Step S200.

In Step S200, the control device 35 starts a boom position calculation step B. The control device 35 calculates the target position coordinate q(n+1) of the boom 9 based on the current position coordinate p(n) of the baggage W, the current position coordinate q(n) of the boom 9 calculated from the attitude information of the boom 9, and the target trajectory signal Pd. When the boom position calculation step B is completed, the processing proceeds to a process of Step S300.

In Step S300, the control device 35 starts an operation signal generation step C. The control device 35 calculates a turning angle θz(n+1) of the turning base 7, an elongation/contraction length Lb(n+1) of the boom 9, a raising angle θx(n+1) of the boom 9, and a fed-out amount Lr(n+1) of the wire rope when the tip of the boom 9 is located at the target position coordinate q(n+1) based on the target position coordinate q(n+1) of the boom 9, and generates the operation signal Md of the turning valve 23, the elongation/contraction valve 24, the raising valve 25, the main valve 26*m* or the sub valve 26*s*. When the operation signal generation step C is completed, the processing proceeds to the process of Step S100.

That is, after calculating the target position coordinate q(n+1) of the boom 9, the control device 35 repeats the target trajectory calculation step A, the boom position calculation step B, and the operation signal generation step C to calculate a target position coordinate q(n+2) of the boom 9 after a lapse of the unit time t. Specifically, the target position coordinate p(n+1) of the baggage W calculated in the previous processing is taken as a current position coordinate, and a direction vector e(n+2) of the wire rope is calculated from the current position coordinate p(n+1) of the baggage W and the next target position coordinate p(n+2). Then, the target position coordinate q(n+2) of the boom 9 after the lapse of the unit time t is calculated from the current fed-out amount Lr(n+1) of the wire rope and the direction vector e(n+2) of the wire rope.

That is, the control device 35 uses inverse dynamics to sequentially calculate the target position coordinate q(n+1) of the boom 9 after the lapse of the unit time t from the current position coordinate p(n) of the baggage W, the target position coordinate p(n+1) of the baggage W, and the direction vector e(n+1) of the wire rope. The control device 35 controls each actuator by feedforward control for generating the operation signal Md based on the target position coordinate q(n+1) of the boom 9.

In this manner, the crane device 6 calculates the target trajectory signal Pd based on the target speed signal Vd of the baggage W that is arbitrarily input, and thus, is not limited to a specified speed pattern. In addition, the crane device 6 generates the control signal (operation signal Md of each actuator) of the boom 9 with the baggage W used as the reference, and applies the feedforward control so that the control signal of the boom 9 is generated based on the target trajectory intended by the operator. As a result, the responsiveness of the actuator to the operator's operation, that is, the operating signals from various operation tools is improved, and the shaking of the baggage W due to a response delay can be suppressed. In addition, an inverse dynamics model is constructed, and the target position coordinate q(n+1) of the boom 9 is calculated from the current position coordinate p(n) of the baggage W, the target position coordinate p(n+1), and the direction vector e(n+1) of the wire rope so that there is no error in a transient state due to acceleration/deceleration or the like. Furthermore, by applying a low-pass filter, since the frequency component including the singular point generated by the differential operation when calculating the target position coordinate q(n+1) of the boom 9 is attenuated, the control of the boom 9 is stable. As a result, when the actuator is controlled with the baggage W used as the reference, the baggage W can be moved along the target trajectory while suppressing the shaking of the baggage W.

Figure 6:
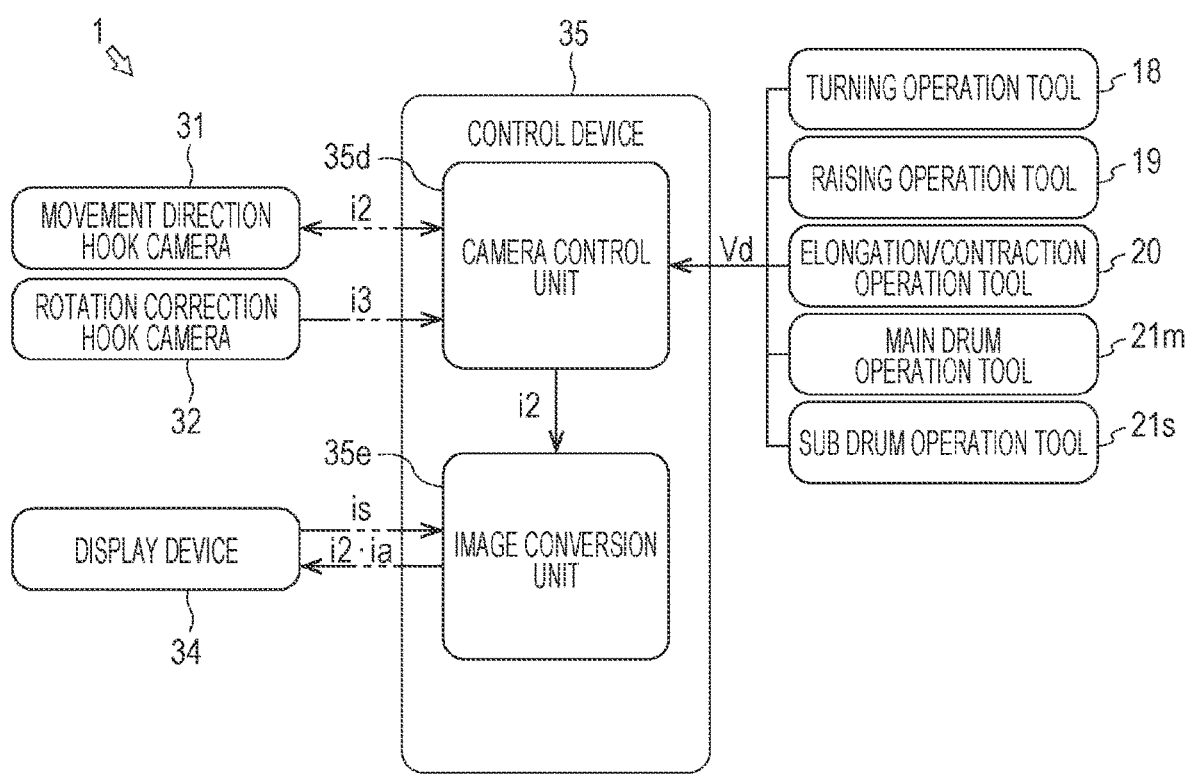
FIG. 6 is a block diagram illustrating a configuration related to image processing of the crane device.
Figure 7A:
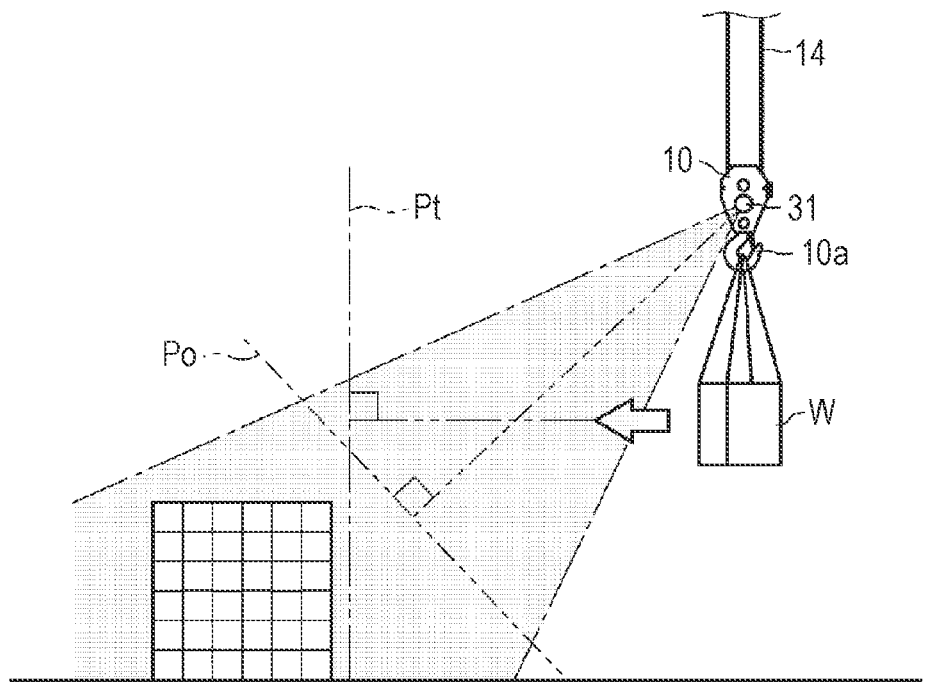
FIGS. 7A and 7B are conceptual views of a projective transformation process.
Figure 7B:
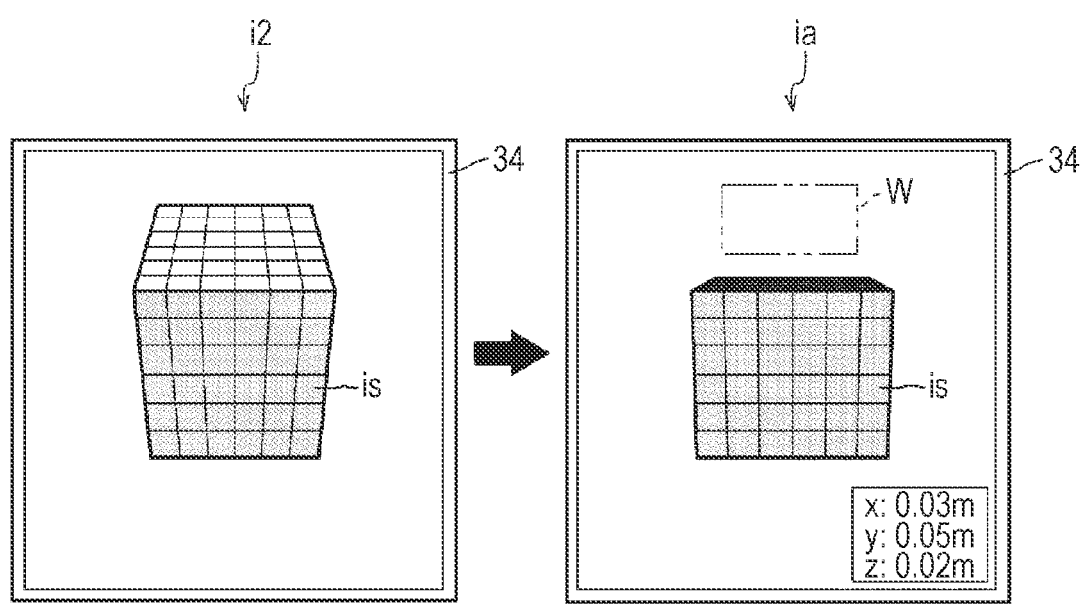

Next, image processing for converting the captured image i2 captured by the movement direction hook camera 31 into the correction image ia on an arbitrary plane will be described with reference to FIGS. 6, 7A, and 7B. FIG. 6 is a block diagram illustrating a configuration related to the image processing of the crane device 6. FIG. 7A is a view illustrating a projection plane of an image captured by the hook camera C, and FIG. 7B is a view illustrating an image that has been subjected to projective transformation. Such image processing is performed by the control device 35 of the crane device 6.

As illustrated in FIG. 6, the control device 35 functions as a camera control unit 35d and an image conversion unit 35e (image processing unit).

The camera control unit 35d transmits control signals based on the target speed signal Vd of the baggage W, the target trajectory signal Pd, and the like, calculated based on the operating signals from various operation tools, to the movement direction hook camera 31. The movement direction hook camera 31 captures an image of a carrying destination of the baggage W, that is, subjects (for example, a feature, a ground surface, a structure, and the like) existing in the movement direction of the baggage W from the main hook block 10 according to the control signal. At the same time, the rotation correction hook camera 32 captures an image of the boom 9 from vertically below (the main hook block 10 side). The camera control unit 35d acquires the captured image i2 captured by the movement direction hook camera 31 and the captured image i3 captured by the rotation correction hook camera 32.

As illustrated in FIG. 7A, the movement direction hook camera 31 captures the subjects such as the feature, the ground surface, and the structure around a trajectory of the baggage W diagonally downward with a position of the main hook block 10 above the baggage W used as a viewpoint. Therefore, the captured image i2 captured by the movement direction hook camera 31 is an image projected on a projection plane Po perpendicular to the capturing direction while taking a position above the baggage W by a vertical length of the slinging tool as the viewpoint. That is, the movement direction hook camera 31 does not capture the feature, the ground surface, the structure, and the like around the trajectory from the viewpoint of the baggage W.

As illustrated in FIG. 7B, the image conversion unit 35e (see FIG. 6) acquires the captured image i2 from the camera control unit 35d (see FIG. 6) and displays the captured image i2 on the display device 34. In addition, if an image of any area (hereinafter simply referred to as a "selection image is") is selected (see the light-ink part) in the captured image i2 displayed on the display device 34, the image conversion unit 35e performs a projective transformation process of converting the captured image i2 into an image on an arbitrary plane with the selection image is as a reference. Specifically, the image conversion unit 35e acquires the selection image is input in the captured image i2 as a correction reference. In addition, the image conversion unit 35e acquires the movement direction as a projection direction. The image conversion unit 35e performs the projective transformation process on the captured image i2 projected on the projection plane Po while taking the baggage W as a viewpoint and taking a plane perpendicular to the acquired projection direction as a conversion projection plane Pt. That is, the conversion projection plane Pt refers to a plane that is parallel to a reference area and perpendicular to an arbitrary direction with the baggage W as the viewpoint, the reference area being an arbitrary area (selection image is) in the captured image i2 captured by the movement direction hook camera 31. The image conversion unit 35e causes the display device 34 to display the correction image ia generated by performing the projective transformation process on the captured image i2.

In addition, the image conversion unit 35e projects an outline view of the baggage W or an image of the baggage W on the correction image ia based on the control information of the crane device 6 and the information on the baggage W and the structure acquired from the BIM. That is, the image conversion unit 35e displays the correction image ia and the outline view of the baggage W or the image of the baggage W on the display device 34 to be superimposed on each other. At this time, the image conversion unit 35e superimposes the correction image ia so as to match the scale and position of the outline view of the baggage W or the image of the baggage W. In addition, the image conversion unit 35e calculates a display ratio from a size of a structure acquired from the BIM and a size of the structure appearing in the correction image ia, and calculates a distance from the baggage W in the correction image ia to the ground surface, the feature, or the structure based on the calculated display ratio and displays the distance on the display device 34.

In this manner, the image conversion unit 35e displays the outline view or the image of the baggage W together with the correction image ia, and displays the distance from the baggage W to the ground surface or the like. That is, the image conversion unit 35e displays a current position of the baggage W in the correction image ia in a visually recognizable mode. As a result, the operator can visually recognize the positional relationship between the baggage W and the peripheral ground surface, feature, structure, or the like through the image or a numerical value.

Figure 8A:
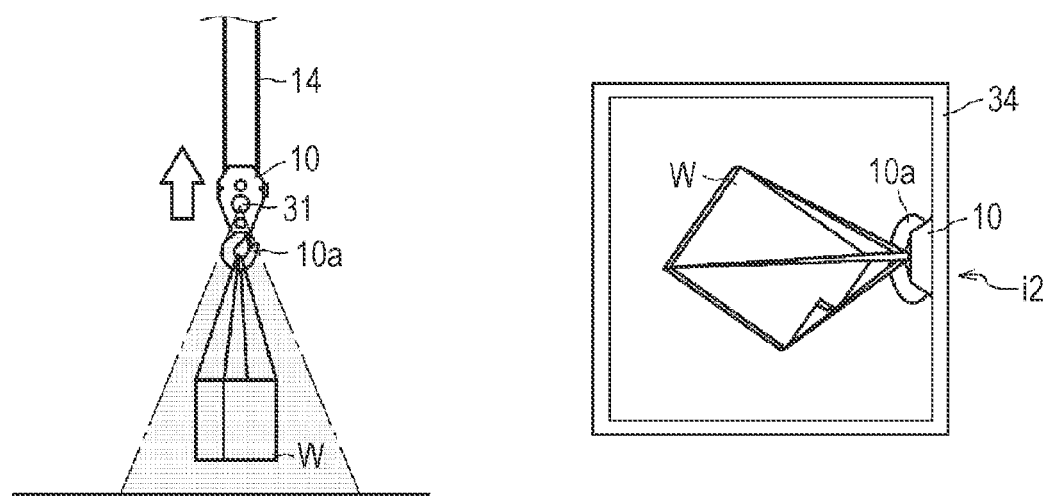
FIGS. 8A and 8B are views illustrating a capturing area of a hook camera and an image thereof when lifting baggage.
Figure 8B:
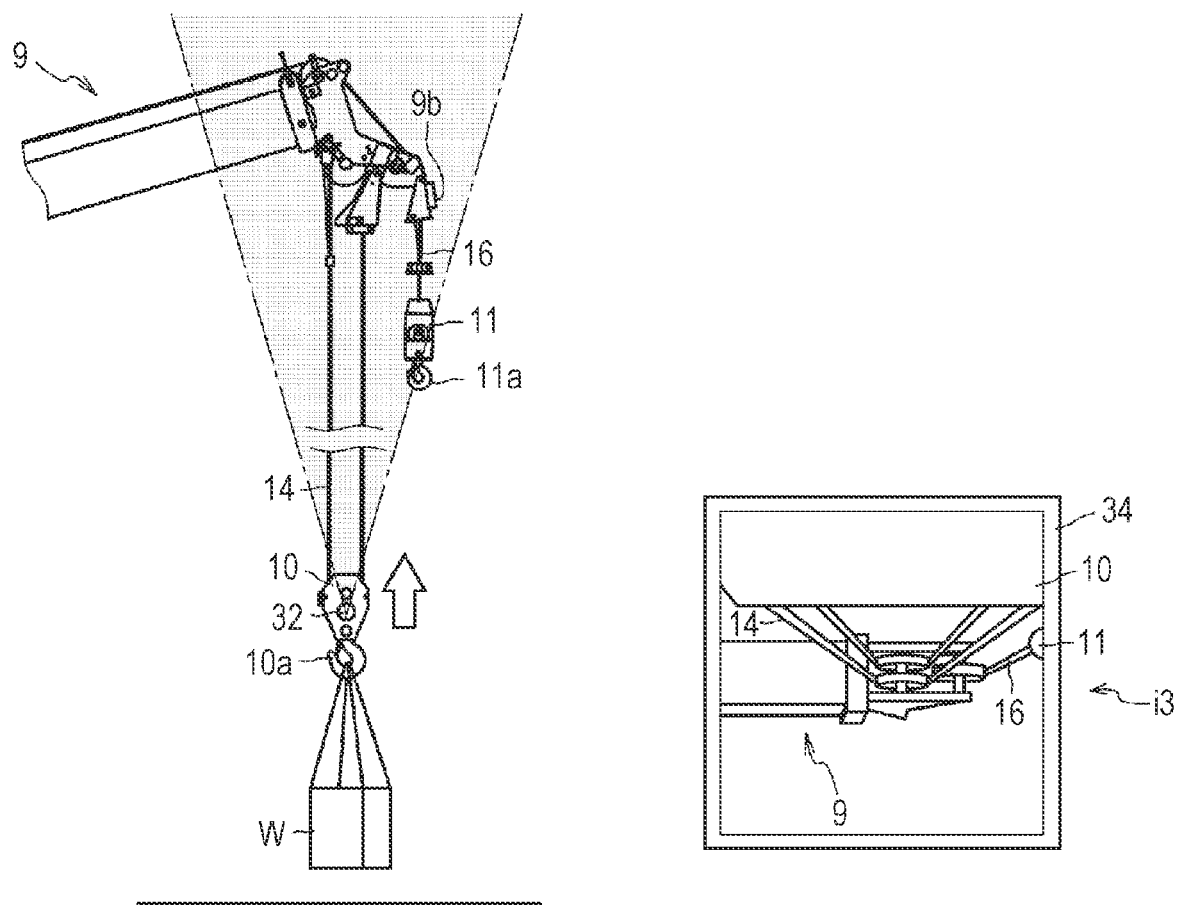
Figure 9A:
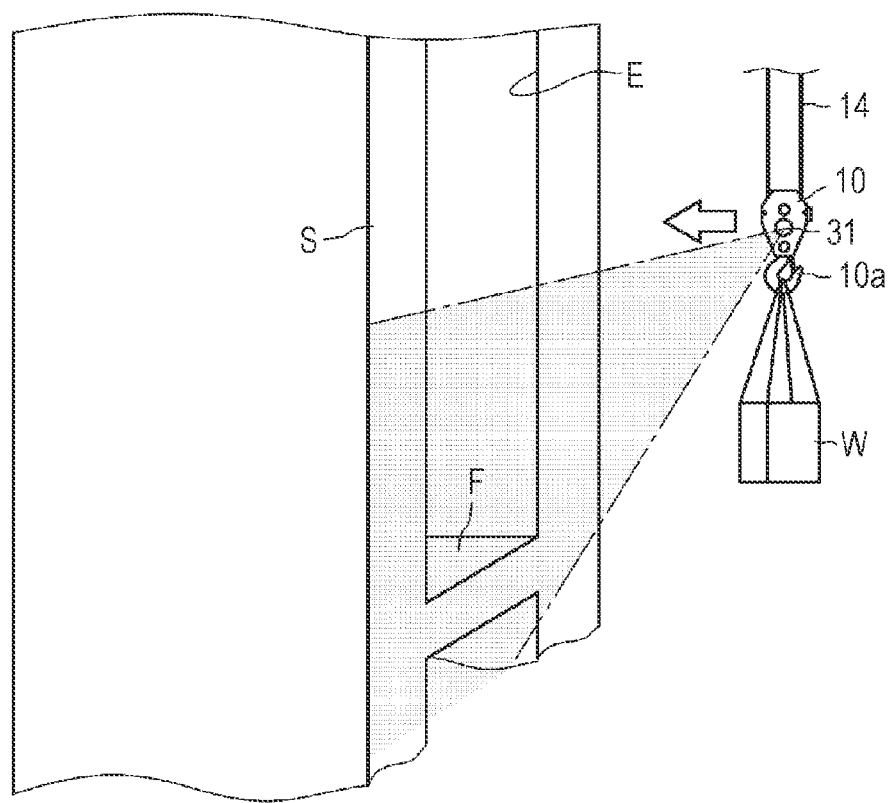
FIGS. 9A and 9B are views illustrating a capturing area of a movement direction hook camera and an image thereof when horizontally moving baggage.
Figure 9B:
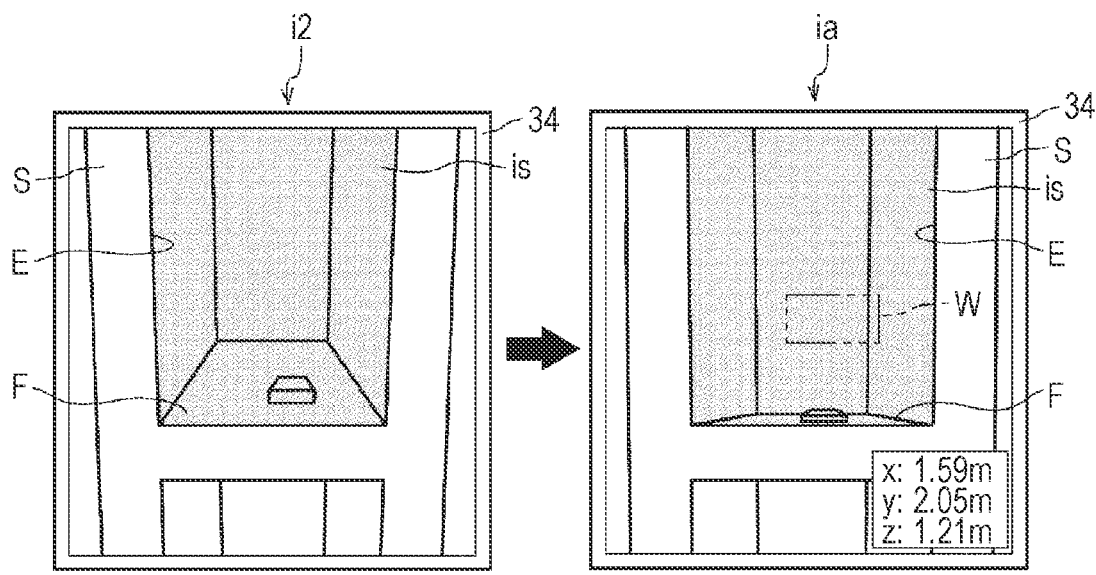
Figure 10A:
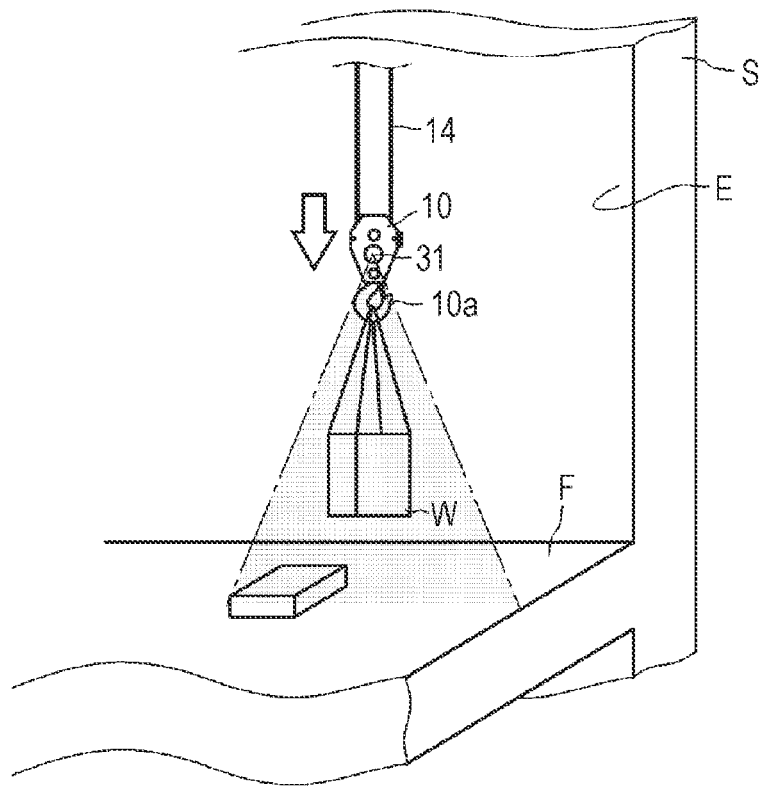
FIGS. 10A and 10B are views illustrating a capturing area of the movement direction hook camera and an image thereof when suspending baggage and an image thereof.
Figure 10B:
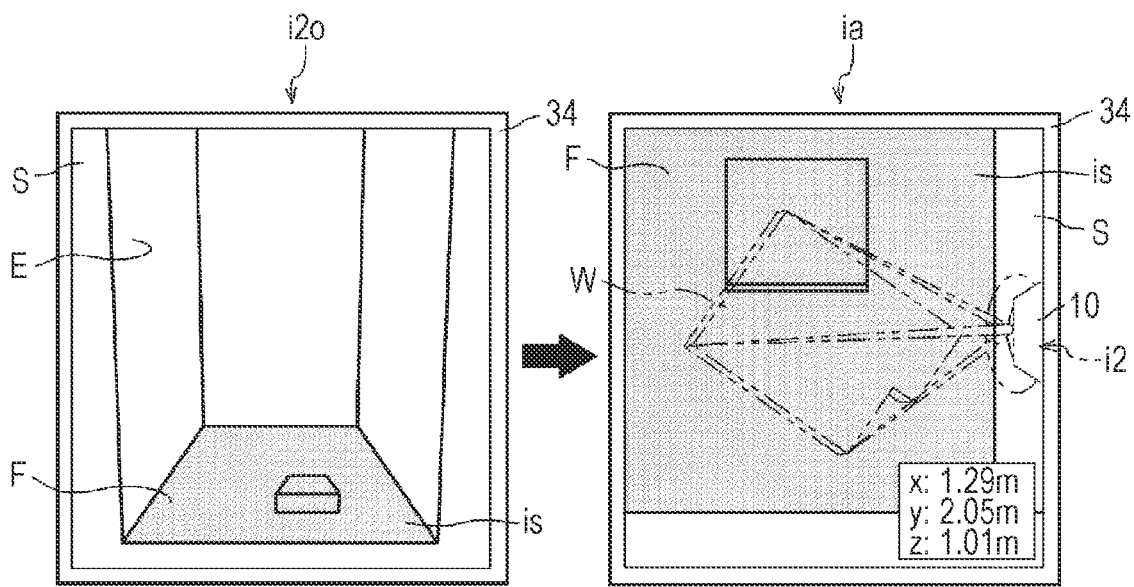

Next, the positioning control of the baggage W using the hook camera C by the crane device 6 will be specifically described with reference to FIGS. 8A to 10B. FIGS. 8A and 8B are views illustrating a capturing area of the hook camera C and an image thereof when lifting baggage. FIG. 8A illustrates a capturing area of the movement direction hook camera 31 and an image thereof, and FIG. 8B illustrates a capturing area of the rotation correction hook camera 32 and an image thereof. FIG. 9A is a view illustrating a capturing area of the movement direction hook camera 31 when horizontally moving baggage, and FIG. 9B is a view illustrating an image that has been subjected to projective transformation. FIG. 10A is a view illustrating a capturing area of the movement direction hook camera 31 when suspending baggage, and FIG. 10B is a view illustrating an image that has been subjected to projective transformation.

The crane device 6 performs positioning control to carry the baggage W onto an inner floor F of a structure S in a state of being suspended from the main hook 10a and arrange the baggage W at a predetermined position. It is assumed that the crane device 6 calculates the current position coordinate p(n) of the baggage W which is a global coordinate of the baggage W. In addition, it is assumed that the crane device 6 acquires information on the baggage W and the structure S from the BIM operated by the external server or the like.

As illustrated in FIG. 8A, the crane device 6 lifts the baggage W suspended from the main hook 10a to a position higher than the floor F of the structure S according to the operator's operation. The crane device 6 uses the movement direction hook camera 31 to capture a vertically downward direction (see the light-ink part) opposite to the movement direction of the main hook 10a (see the white arrow). That is, the movement direction hook camera 31 captures an upper surface of the baggage W as the captured image i2.

In addition, the crane device 6 captures the boom 9 as the captured image i3 with the rotation correction hook camera 32 as illustrated in FIG. 8B. The control device 35 of the crane device 6 calculates a suspended attitude of the baggage W, suspended on the main hook 10a, with respect to the boom 9 based on the acquired captured images i2 and i3. The control device 35 controls a capturing direction of the movement direction hook camera 31 from the suspended attitude of the baggage W with respect to the boom 9. In addition, the control device 35 calculates the rotation angle θ of the baggage W with respect to the boom 9 from the suspended attitude of the baggage W with respect to the boom 9, and displays the correction image ia of the floor F that has been rotated by the rotation angle θ in a direction opposite to the rotation direction of the baggage W.

As illustrated in FIG. 9A, the crane device 6 moves the baggage W in a substantially horizontal direction toward the floor F while maintaining the baggage W at a position higher than the floor F of the structure S according to the operator's operation (see the white arrow). The crane device 6 captures a carrying direction of the baggage W (lower side in the movement direction of the baggage W) as the captured image i2 with the movement direction hook camera 31 (see the light-ink part). In the present embodiment, the movement direction hook camera 31 captures the floor F of the structure S and a carry-in entrance E of the floor F which are carrying destinations of the baggage W. The control device 35 stores the captured image i2 and the current position coordinate p(n) of the baggage W in association with each other for a certain period of time.

As illustrated in FIG. 9B, the control device 35 displays the captured image i2 on the display device 34. The captured image i2 is an image captured at an angle of looking down on the floor F and the carry-in entrance E to the floor F from above. When the operator inputs an area (light-ink part) surrounding the carry-in entrance E as the selection image is in the captured image i2 displayed on the display device 34, the control device 35 performs projective transformation to project the captured image i2 onto the conversion projection plane Pt (see FIG. 7A) whose projection direction is the movement direction of the baggage W with the selection image is as a reference. That is, the control device 35 generates the correction image ia that displays the carry-in entrance E in the movement direction of the baggage W with the baggage W as the viewpoint from the captured image i2 by the projective transformation. The control device 35 generates the correction image ia from the captured image i2 captured by the movement direction hook camera 31 every unit time t as the main hook 10a moves.

In addition, the control device 35 projects the outline view of the baggage W on the correction image ia. The control device 35 calculates a position of the center of gravity of the baggage W and a shape of a projection view of the baggage W in the correction image ia, for example, based on the information on the baggage W and the structure S obtained from the BIM, the current position coordinate p(n) of the baggage W, and the suspended attitude of the baggage W with respect to the boom 9. In addition, the control device 35 calculates the display ratio from the size of the structure S acquired from the BIM and the size of the structure S appearing in the correction image ia, and calculates the size of the baggage W in the correction image ia. Then, the control device 35 displays the baggage W in the correction image ia based on the calculated position of the center of gravity, shape, and size of the baggage W. In addition, the control device 35 calculates and displays the shortest distance from an outer edge of the baggage W to the structure S based on the display ratio.

As illustrated in FIG. 10A, when the operator's unloading operation is performed in the vicinity of an unloading position of the baggage W, the crane device 6 moves the baggage W suspended from the main hook 10a vertically downward toward the floor F of the structure S (see the white arrow). The crane device 6 captures the vertically lower side, which is the movement direction of the main hook 10a, with the movement direction hook camera 31 (see the light-ink part). That is, the movement direction hook camera 31 captures the upper surface of the baggage W as the captured image i2.

As illustrated in FIG. 10B, when the control device 35 acquires a control signal for suspending the baggage W, the control device 35 causes the display device 34 to display an immediately preceding image i2o including the floor F among captured images i2 captured during horizontal movement. When the operator inputs an area (light-ink part) surrounding the floor F as the selection image is in the captured image i2o displayed on the display device 34, the control device 35 performs projective transformation to project the captured image i2o onto the conversion projection plane Pt (see FIG. 7A) in the vertically downward direction of the baggage W with the selection image is used as a reference. That is, the control device 35 generates, from the captured image i2o, the correction image ia that displays the unloading position of the baggage W on the vertically lower side with the baggage W used as a viewpoint, by the projective transformation.

Next, the control device 35 combines the correction image ia with an upper surface image of the baggage W (see the two-dot chain line in FIG. 10B), which is the current captured image i2, and displays the combined image on the display device 34. At this time, the control device 35 calculates the position of the center of gravity of the baggage W in the correction image ia from the information on the baggage W and the structure S acquired from the BIM, the calculated rotation angle θ of the baggage W, and the current position coordinate p(n) of the baggage W. In addition, the control device 35 calculates the display ratio and calculates the size of the baggage W in the correction image ia. Then, the control device 35 converts the correction image ia based on the calculated position of the center of gravity and the size of the baggage W, and displays the correction image ia to be superimposed on the captured image i2 every unit time. In addition, the control device 35 generates the correction image ia corresponding to the current position coordinate p(n) of the baggage W from the captured image i2o as the main hook 10a moves, and displays the correction image ia to be superimposed on the captured image i2 of the baggage W. Further, the control device 35 calculates and displays the shortest distance from the outer edge of the baggage W to the floor F based on the display ratio.

With such a configuration, the crane device 6 displays the projection view of the baggage W to be superimposed on the correction image ia by using the correction image ia of the movement direction obtained by taking the baggage W as the viewpoint and the information on the baggage W and the structure S. That is, in the crane device 6, the positional relationship between the floor F and the carry-in entrance E with respect to the baggage W is displayed as the image or numerical value with the correction image ia even if the baggage W itself is not captured by the movement direction hook camera 31. As a result, highly accurate installation work can be performed without being influenced by the shape of the baggage W and an installation condition of the baggage W. In addition, in the crane device 6, the correction image ia of the floor F on the vertically lower side with the baggage W as the viewpoint is generated from the immediately previous image i2o capturing the image of the floor F vertically below the baggage W even if the floor F vertically below the baggage W is hidden by the baggage W. At this time, since the projection view of the baggage W is rotated and displayed according to the rotation of the baggage W, it is easy to grasp a state of the baggage W. In addition, in the crane device 6, a backup function for complementing a function of one movement direction hook camera 31 with the other movement direction hook camera 31 is realized by the plurality of movement direction hook cameras 31 having different capturing areas, so that a system with redundancy is constructed. As a result, highly accurate installation work can be performed without being influenced by the shape of the baggage W and an installation condition of the baggage W.

As described above, the crane device 6 according to the present embodiment is a crane device, which actuates the carrying element including the boom 9 and the main hook 10a or the sub hook 11a suspended from the boom 9 and carries the baggage to the carrying destination, and includes: the hook camera C provided on the main hook 10a or the sub hook 11a; the camera control unit 35d which controls an image-capturing operation of the hook camera C based on control information for operating the carrying element; and the image conversion unit 35e (image processing unit) which processes the captured images i2 and i3 that have been captured with the hook camera C. The hook camera C captures an image of the carrying destination of baggage W. The image conversion unit 35e takes, as a reference area, an arbitrary area in the captured image that has been captured with the hook camera C, generates the correction image ia obtained by projecting the captured image onto the conversion projection plane Pt that is parallel to the reference area and perpendicular to an arbitrary direction with the baggage W used as the viewpoint, calculates a current position of the baggage W in the correction image, and displays the current position in a visually recognizable mode.

In the crane device 6, a position of the baggage W with respect to a feature or an obstacle is calculated based on the correction image ia taking the position of the baggage W generated by the conversion of the captured image i2 as the viewpoint, and is displayed in the visually recognizable mode without providing a camera in the baggage W. As a result, highly accurate installation work can be performed without being influenced by the shape of the baggage W and an installation condition of the baggage W.

In addition, in the crane device 6, the image conversion unit 35e (image processing unit) displays the projection view of the baggage W to be superimposed on the correction image ia.

Since the outer shape of the baggage W is superimposed and displayed on the planar image (correction image ia) generated by the image conversion, the current position of the baggage W in the plane image can be grasped even if the baggage W itself is not captured. As a result, the highly accurate installation work can be performed without being influenced by the shape of the baggage W and the installation condition of the baggage.

In addition, in the crane device 6, the hook camera C captures the baggage W vertically downward, and the image conversion unit 35e (image processing unit) takes, as the reference area, the ground surface in the captured image i2 of the carrying destination, generates the correction image ia in which the captured image i2 is projected onto the front surface vertically below the baggage W, combines the correction image ia with the captured image i2 of the baggage W, calculates a current position of the baggage W with respect to the ground surface, and displays the current position in a visually recognizable manner.

Even if the ground surface below the baggage is hidden by the baggage W, an image of the ground surface below the baggage viewed from vertically above is generated from the captured image acquired in advance, the position of the baggage W with respect to the feature or the like is calculated, and the image is displayed in the visually recognizable mode. As a result, the highly accurate installation work can be performed without being influenced by the shape of the baggage W and the installation condition of the baggage.

In addition, in the crane device 6, the hook camera C captures an image of the boom 9, and the image conversion unit 35e (image processing unit) calculates the rotation angle of the baggage W based on the captured image i3 of the boom 9, and displays the correction image ia of the ground surface that has been rotated by the rotation angle in the direction opposite to the rotation direction of the baggage W.

It is easy to grasp the state of the baggage since the baggage W is displayed on a display screen as if being rotated with respect to the ground surface according to the rotation of the baggage W. As a result, the highly accurate installation work can be performed without being influenced by the shape of the baggage W and the installation condition of the baggage.

Note that the crane device 6 of the mobile crane 1 has been described in the present embodiment, but the present invention can be applied to a crane device that lifts and carries the baggage W with a carrying element such as a wire. In addition, the crane device 6 may be configured to be remotely controlled by a remote control terminal having an operation stick that instructs the movement direction of the baggage W as a tilting direction and instructs the movement speed of the baggage W as a tilting angle. At this time, the crane device 6 displays an image captured by the hook camera C on the remote control terminal, so that the operator can accurately grasp a condition around the baggage W even from a remote location. In addition, robustness is improved by feeding back current position information of the baggage W based on the image taken by the hook camera C in the crane device 6. That is, according to the crane device 6, the baggage W can be moved stably without being aware of the weight of the baggage W or a change in characteristics due to the disturbance.

The above-described embodiment merely illustrates a typical form, and various modifications can be implemented within a scope not departing from a gist of the embodiment. Needless to say, the present invention can be implemented in various forms, and the scope of the present invention encompasses those illustrated in the description of the claims, those having meanings equivalent to those in the claims, and all alterations within the scope.

REFERENCE SIGNS LIST

1 crane
6 crane device
7 turning base
9 boom
10*a* main hook
31 movement direction hook camera
32 rotation correction hook camera
35 control device
35*d* camera control unit
35*e* image conversion unit (image processing unit)
C hook camera
i2 captured image
is selection image
ia correction image
W baggage

The invention claimed is:

1. A crane device, which actuates a carrying element including a boom and a hook suspended from the boom and carries baggage to a carrying destination, comprising:

a camera provided on the hook;
a camera processor which controls an image-capturing operation of the camera based on control information for operating the carrying element; and
an image processor which processes a captured image that has been captured with the camera, wherein
the camera processor controls the image-capturing operation of the camera so that the camera rotates in at least a vertical direction of the camera to face the carrying destination of the baggage,
the camera captures an image of the carrying destination of the baggage,
the image processor takes, as a reference area, an arbitrary area in the captured image that has been captured with the camera, generates a first correction image viewed from the baggage obtained by projecting the captured image onto a plane that is perpendicular to a movement direction of the baggage, calculates a current position of the baggage in the first correction image, and displays the current position in a visually recognizable mode, and
the image processor generates a second correction image in which the captured image is projected onto a front surface vertically below the baggage.

2. The crane device according to claim 1 wherein the image processor displays a projection view of the baggage to be superimposed on either of the first correction image or the second correction image.

3. The crane device according to claim 1, wherein the camera captures an image of the baggage vertically downward, and
the image processor takes, as the reference area, a ground surface in the captured image of the carrying destination, combines the second correction image with the captured image of the baggage, and calculates a current position of the baggage with respect to the ground surface.

4. The crane device according to claim 3, wherein the camera captures an image of the boom, and
the image processor calculates a rotation angle of the baggage based on the captured image of the boom, and displays a third correction image of the ground surface that has been rotated by the rotation angle in a direction opposite to a rotation direction of the baggage.

* * * * *